United States Patent
Yang et al.

[11] Patent Number: 6,097,174
[45] Date of Patent: Aug. 1, 2000

[54] INDIVIDUALLY ADJUSTABLE TYPE AUTOMATIC CHARGING CIRCUIT FOR MULTIPLE BATTERIES

[76] Inventors: Tai-Her Yang; Yang Chen, both of 6F-5 No. 250, Sec. 4, Chung Hsiao E. Rd., Taipei, Taiwan

[21] Appl. No.: 09/156,618

[22] Filed: Sep. 18, 1998

[51] Int. Cl.[7] .................................................. H02J 7/00
[52] U.S. Cl. ............................................ 320/119; 320/160
[58] Field of Search ..................................... 320/116, 117, 320/119, 120, 121, 160

[56] References Cited

U.S. PATENT DOCUMENTS

| | | | |
|---|---|---|---|
| 3,921,050 | 11/1975 | Rowas | 320/119 |
| 3,928,791 | 12/1975 | Mullersman | 320/119 |
| 4,136,310 | 1/1979 | Foster | 320/156 |
| 4,213,080 | 7/1980 | Rock | 320/156 |
| 4,297,629 | 10/1981 | Godard et al. | 320/117 |
| 5,003,244 | 3/1991 | Davis, Jr. | 320/119 |
| 5,013,991 | 5/1991 | Brune | 320/116 |
| 5,218,285 | 6/1993 | Carlton et al. | 320/119 |
| 5,266,881 | 11/1993 | Hoffman et al. | 320/116 |
| 5,357,187 | 10/1994 | Park | 320/116 |
| 5,483,144 | 1/1996 | Marek | 320/126 |
| 5,498,950 | 3/1996 | Ouwerkerk | 320/119 |
| 5,617,004 | 4/1997 | Kaneko | 320/119 |
| 5,629,601 | 5/1997 | Feldstein | 320/119 |
| 5,698,967 | 12/1997 | Baer et al. | 320/119 |
| 5,729,117 | 3/1998 | Fukuda | 320/117 |
| 5,835,989 | 11/1998 | Nagai | 320/116 |
| 5,898,291 | 4/1999 | Hall | 320/120 |
| 5,929,602 | 7/1999 | Suzuki | 320/116 |

*Primary Examiner*—Adolf Deneke Berhane
*Assistant Examiner*—Pia Tibbits
*Attorney, Agent, or Firm*—Bacon & Thomas, PLLC

[57] ABSTRACT

An individually adjustable automatic charging circuit for multiple batteries includes two or more charging terminals or battery seats for a single or multiple chargeable batteries with the same or different residual electric capacities, and voltage adjusting components connected across each respective pair of charging terminals or battery seats. The charging circuit is capable of individually or simultaneously initiating and completing charging of respective batteries, so that each chargeable battery can be randomly inserted for charging or removed without considering the residual electric capacity status and without affecting the charging status of other batteries.

6 Claims, 2 Drawing Sheets

INDIVIDUALLY ADJUSTABLE TYPE AUTOMATIC CHARGING CIRCUIT FOR MULTIPLE BATTERIES

BACKGROUND OF THE INVENTION

The conventional charger used for two or more chargeable batters usually adopts a parallel charging method. According to this method, when only one chargeable battery is charged, the conventional charger can work normally, but when two or more than two chargeable batteries are parallel charged, the batteries must first be discharged to zero the electric capacities and thereby compensate for the different individual residual electric capacities of the batteries, after which the batteries are parallel combined for simultaneous charging. As a result, the following inconveniences are caused: 1) the discharge operation is time-consuming while the battery working life is reduced, and the electric power is wasted; and 2) if some of the chargeable batteries have been put in the charger and have been charged for some time, and another battery with a lower electric capacity is then inserted for parallel charging, the charging time for the originally-inserted batteries is prolonged accordingly.

SUMMARY OF THE INVENTION

An individually adjustable automatic charging circuit for multiple batteries includes two or more charging terminals or battery seats for a single or multiple chargeable batteries with the same or different residual electric capacities. The charging circuit is capable of individually or simultaneously initiating and completing charging of respective batteries, so that each chargeable battery can be randomly inserted for charging or removed without considering the residual electric capacity status and without affecting the charging status of other batteries.

DETAILED DESCRIPTION OF THE INVENTION

Figure 1:
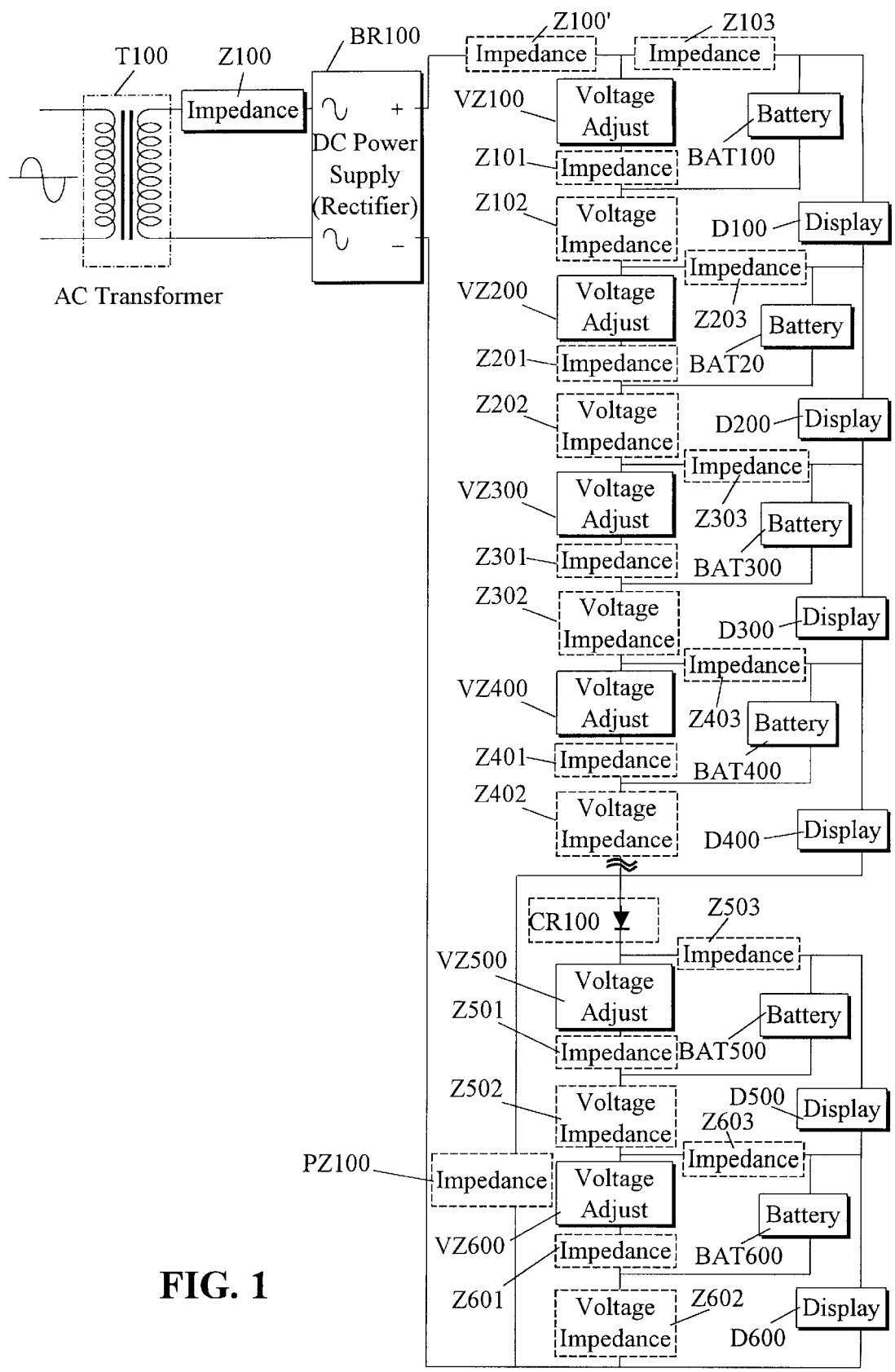
FIG. 1 is a schematic diagram illustrating a series combination type circuit of a preferred individually adjustable type automatic charging circuit for multiple batteries.

In general, the invention provides an individually adjustable automatic charging circuit for multiple batteries in which two or more charging terminals or battery seats are included for charging a single or multiple chargeable batteries with the same or different residual electric capacities, individually or simultaneously, the charging circuit providing an individually adjustable automatic charging function for each charging battery in order to permit each chargeable battery to be randomly inserted or removed without considering the residual electric capacity status and without affecting the charging status of other batteries. The load side charging circuit may include series, parallel, or mixtures of series and parallel combinations of two or more individually adjustable circuits, each individually adjustable charging circuit being arranged to receive a charging power input from an AC rectified DC power source or a direct DC power source, and provides two or more charging terminal outputs for the corresponding batteries. More specifically, FIG. 1 shows a series combination type individually adjustable automatic charging circuit for multiple batteries, including all or some of the following elements:

- An optional AC transformer T100 having primary terminals for receiving an AC power input and secondary terminals for providing an AC power output;
- An AC current-limiting impedance Z100 in the form of a capacitive, or inductive, or resistive impedance component, or a mixed type AC current-limiting impedance device constituted by two or more of the aforesaid impedance components for preventing a short-circuit at the load side, the current-limiting impedance being series combined between the AC power source and the rectifier device BR100;
- An optional DC current-limiting impedance device Z100' for use in connection with a DC power source or rectified AC power source when the AC current-limiting impedance Z100 is not series combined at the AC side, the DC current-limiting impedance device being constituted by a resistance, or active transistors and a driving circuit, and series combined between the DC power source and the load side; and
- Individually adjustable circuits made up of distributed voltage adjusting components VZ100–VZ600 in the form of series combined diodes or zener diodes oriented in the current direction to provide the two or more charging terminals (or battery seats) with current matched to two or more corresponding chargeable batteries that can be randomly selected to be inserted or removed individually or simultaneously.

The individually adjustable circuits can be selected according to requirements to further include series combined bias voltage impedance circuitry. As illustrated, for example, the individually adjustable circuits further include first bias voltage impedances Z101–Z601 constituted by resistive components respectively connected in series with the distributed voltage adjusting components VZ100–VZ600 in the following order: Z100→Z101→VZ200→Z201→VZ300→Z301 ... VZ600→Z601, thereby forming multiple stage distributed voltage circuits wherein VZ100 is series combined with Z101 to constitute the first individual adjusting unit, VZ200 is series combined with Z201 to constitute the second individual adjusting unit, ... VZ600 is series combined with Z601 to constitute the sixth individual adjusting unit, and so forth. The individual adjusting units are mutually series combined so that the two terminals of each individual adjusting unit are connected to the charging terminal (or battery seat) to provide charging power.

In addition, the aforesaid individually adjustable circuits can be further optionally installed with light-emitting circuit devices to display the charging status of the battery, the brightness of the display corresponding to the variation in the terminal voltage of the chargeable battery. The light-emitting display circuits D100–D600 may be constituted by components such as LEDs or light bulbs which convert electric power into light power, and matched series combined current-limiting impedances as required, and are combined with the individually adjustable circuits in any of the following ways:

1) The display circuits may be directly parallel combined with the charging terminals (or battery seats);
2) Each individually adjustable circuit may further include a second bias voltage impedance Z102–Z602 to adjust the driving bias of the set of corresponding light-emitting display circuits D100–D600;
3) The positive terminal or the negative terminal of each individually adjustable circuit may further respectively be series combined with a third bias voltage impedance Z103–Z603 and parallel combined with the charging terminal (or battery seat) and light-emitting display circuit devices D100–D600; or 4) If the second bias voltage impedance Z102–Z602 in the aforesaid item 2) and the third bias voltage impedance Z103–Z603 in the aforesaid item 3) are installed simultaneously, or if the charging current provided at each charging terminal must accommodate different rating currents, the two terminals of the individually adjustable circuit can be parallel combined with distributed impedance PZ100 to correspondingly distribute the current flow to the distributed current impedance PZ100 and the respective individually adjustable circuit which has been parallel combined with the distributed current impedance PZ100. Further, to avoid reverse discharge of the chargeable battery through the distributed current impedance PZ100, the diode CR100 can be further series combined with the respective individually adjustable circuit, which has been parallel combined with the distributed current impedance PZ100 to exhibit the same polarity, while another end of the diode may be parallel combined with the distributed current impedance PZ100. The individually adjustable charging circuit of the preferred embodiment may be further characterized by the following:

Chargeable batteries BAT100–BAT600 may be constituted by the chargeable/dischargeable batteries such as lead acid, nickel-hydrogen, nickel-iron, or lithium batteries, or other secondary chargeable batteries;

The aforesaid first bias voltage impedances Z101–Z601, the second bias voltage impedances Z102–Z602, the third bias voltage impedances Z103–Z603, and the distributed current impedance PZ100 can be optionally selected to be constituted by general resistors or resistors with positive temperature coefficient (PTC) or negative temperature coefficient (NTC).

Although the aforesaid embodiment illustrates a series combination of six individually adjustable circuits, it is not limited to only six circuits, but rather may be constituted by series combining two or more individually adjustable circuits, and characterized in that all or part of the charging terminals (or battery seats) which are respectively parallel combined with each individually adjustable circuit to allow for the individual batteries to be randomly removed or inserted for charging.

Figure 2:
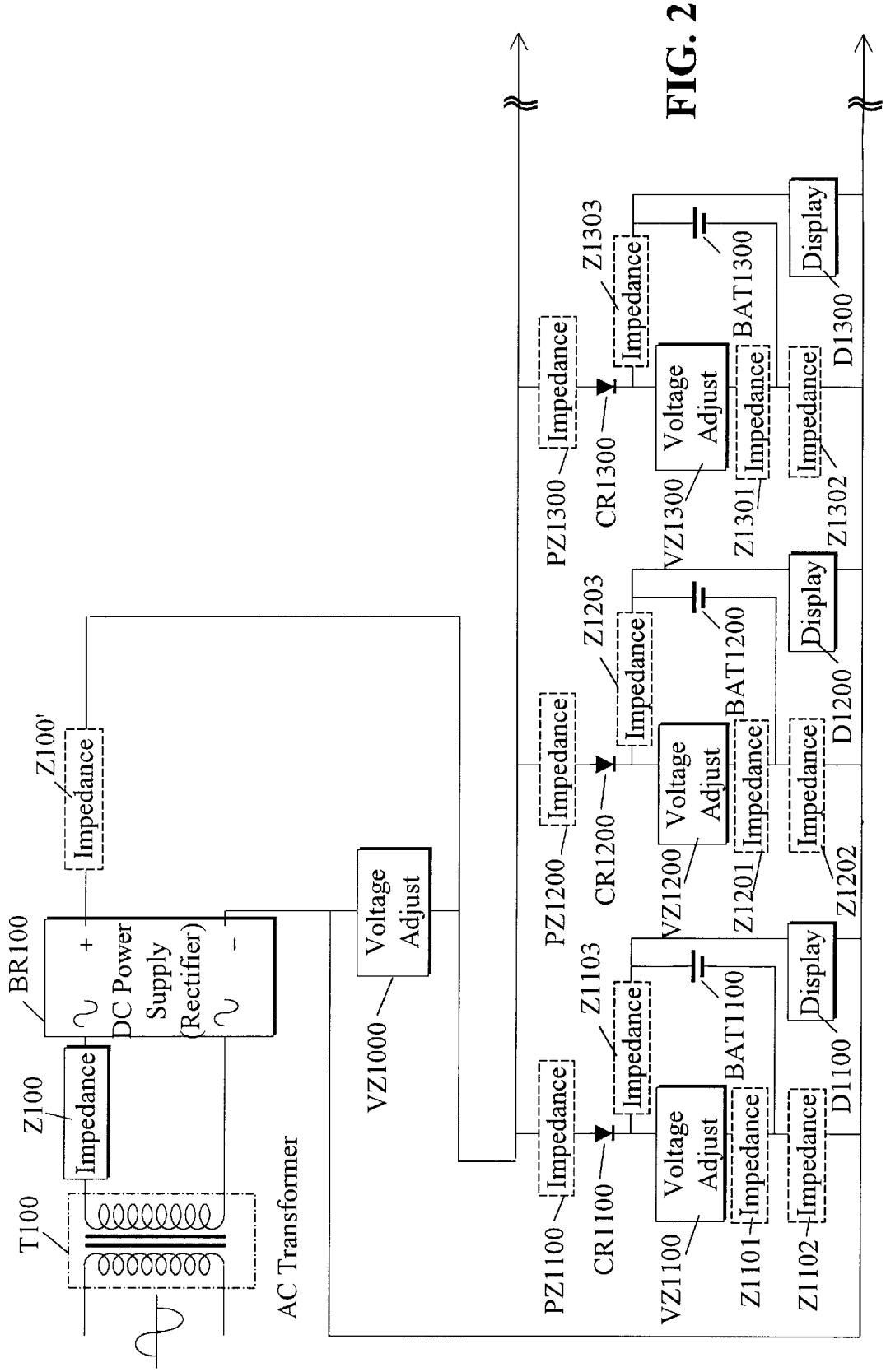
FIG. 2 is a schematic diagram illustrating a parallel combination type circuit of a second preferred individually adjustable type automatic charging circuit for multiple batteries.

FIG. 2 shows a parallel combination type circuit of the individually adjustable automatic charging circuit for multiple batteries, including all or some of the following elements:

An optional AC transformer T100 having primary terminals for receiving an AC power input and secondary terminals for providing an AC power output;

An AC current-limiting impedance Z100 in the form of a capacitive, or inductive, or resistive AC impedance component, or a mixed type AC current-limiting impedance device constituted by two or more of the aforesaid impedance components for preventing a short-circuit at the load side, the current-limiting impedance being series combined between the AC power source and the rectifier device BR100;

An optional DC current-limiting impedance device Z100' for use in connection with a DC power source or rectified AC power source when the AC current-limiting impedance Z100 is not series combined at the AC side, the DC current-limiting impedance device being constituted by a resistance, or active transistors and a driving circuit, and series combined between the DC power source and the load side; and An optional zener effect component VZ1000 constituted by a zener diode or diode group biased in the current direction to provide a voltage stabilizing function: and Individually adjustable circuits made up of distributed voltage adjusting components VZ1100–VZ1300 in the form of series combined diodes or zener diodes oriented in the current direction to provide two or more charging terminals (or battery seats) for matching with two or more corresponding chargeable batteries that can be randomly selected to be put inserted or removed individually or simultaneously.

As in the first preferred embodiment, the individually adjustable circuits can be selected according to requirements to further include series combined bias voltage impedance circuitry such as the illustrated first bias voltage impedances Z1101–Z1301, which are constituted by resistive components to respective series combine with the diodes CR1100 and CR1300 and the distributed voltage adjusting components VZ1100–VZ1300, and which are then commonly parallel combined with the DC power source. As a result, VZ1100 is series combined with Z1101 and diode CR1100 to constitute the first individual adjusting unit, VZ1200 is series combined with Z1201 and CR1200 to constitute the second individual adjusting unit, . . . VZ1300 is series combined with Z1301 and diode CR1300 to constitute the third individual adjusting unit, and so forth. The individual adjusting units are mutually series combined with the same polarity, and the two ends of each individual adjusting unit that do not include the diode serve as the output terminals which are connected to the charging terminals (or battery seats) for providing charging power.

In addition, the aforesaid individually adjustable circuits can be further optionally installed with light-emitting display circuit devices to display the charging status of the battery, the brightness of the display corresponding to the variation in the terminal voltage of the chargeable battery.

The light-emitting display circuits D1100–D1300 may be constituted by components such as LEDs or light bulbs which convert electric power into light power, and matched series combined current-limiting impedances as required, and are combined with the individually adjustable circuits in any of the following ways:

5) The display circuits may be directly parallel combined with the charging terminals (or battery seats);

6) Each individually adjustable circuit may further include a second bias voltage impedance Z1102–Z1302 to adjust the driving bias of the set of corresponding light-emitting display circuits D1100–D1300;

7) The positive terminal or the negative terminal of each individually adjustable circuit may further respectively be series combined with a third bias voltage impedance Z1103–Z1303 and parallel combined with the charging terminal (or battery seat) and light-emitting display circuit devices D100–D600; or 8) If the second bias voltage impedance Z1102–Z1302 in the aforesaid item 2) and the third bias voltage impedance Z1103–Z1303 in the aforesaid item 3) are installed simultaneously, or if the charging current provided at each charging terminal must accommodate different rating currents, the individually adjustable circuits can be series combined with current-limiting impedances PZ1100–PZ1300 to correspondingly distribute the current flow to each of the individually adjustable circuits.

The chargeable batteries BAT100–BAT1300 may be constituted by the chargeable/dischargeable batteries such as lead acid, nickel-hydrogen, nickel-iron, lithium batteries or other secondary chargeable batteries.

The aforesaid first bias voltage impedances Z1101–Z1301, the second bias voltage impedances Z1102–Z1302, the third bias voltage impedances Z1103–Z1303, and the current-limiting impedances PZ100–PZ1300 can be optionally selected to be constituted by general resistors or resistors with a positive temperature coefficient (PTC) or negative temperature coefficient (NTC).

Although the aforesaid embodiment is illustrated as including three individually adjustable circuits that are first respectively series combined with a diode in the polarity direction and then parallel combined, the embodiment is not limited to three circuits only, but rather may be constituted by parallel combining two or more individually adjustable circuits, and characterized in that all or part of the charging terminals (or battery seats) are respectively parallel combined with each individually adjustable circuit to allow for the individual batteries to be randomly removed or inserted for charging.

In addition, the aforesaid series or parallel combined adjustable circuit can made up of a mixture of parallel and series combined circuits, according to the same circuit principles used in constructing the embodiments of FIGS. 1 and 2, and therefore are not repeated here.

In any circumstances, the series combined, parallel combined or mixture of series and parallel combined circuits of the preferred individually adjustable automatic charging circuit may include further combinations of any number of two or more such charging circuits or units.

Due to the development of portable consumer electronics in recent years, demands for disposable batteries have increased daily, but disposable batteries are not only expensive and uneconomical, but also have become an environmental concern. The individually adjustable type automatic charging circuit for multiple batteries as described herein, which provides charging terminals (or battery seats) arranged to provide charging without the need to take into account differences in residual electric capacities of the batteries, so that the single or multiple batteries can be individually and randomly inserted for charging or removed after saturation, should greatly reduce the need for disposable batteries by increasing the convenience of using rechargeable batteries, providing an electric equivalent to the all-you-can-eat buffet in terms of user convenience and satisfaction. Because the technology of this individually adjustable type automatic charging circuit for multiple batteries is innovative with practical benefits, your lawful approval on this application is greatly appreciated.

What is claimed is:

1. A charging circuit for at least two batteries, comprising:

at least two pairs of charging terminals, each of said pairs of charging terminals including a first charging terminal and a second charging terminal, said first and second charging terminals being arranged to engage respective positive and negative terminals of batteries inserted between the charging terminals for charging;

a power supply for supplying charging currents to said charging terminals; and a respective voltage adjusting circuit connected between said first and second charging terminals of each of said pairs of charging terminals, said voltage adjusting circuit causing said charging currents to vary for each pair of charging terminals depending on electric capacities of the individual batteries inserted between the terminals, thereby permitting individually batteries to be individually inserted and removed at random without regard to battery capacity, without requiring the batteries to be first be discharged for simultaneous charging, and without affecting charging of other batteries by the charging circuit.

2. A charging circuit as claimed in claim 1, wherein said voltage adjusting circuits include zener diodes.

3. A charging circuit as claimed in claim 1, further comprising distributed impedances connected in series with said voltage adjusting circuits between said first and second terminals.

4. A charging circuit as claimed in claim 1, wherein said pairs of charging terminals are connected in series with said power supply.

5. A charging circuit as claimed in claim 1, wherein said pairs of charging terminals are connected in parallel with said power supply.

6. A charging circuit as claimed in claim 1, further comprising display circuits arranged to display a charging status of each of said batteries.

* * * * *